Feb. 6, 1968  C. L. LOVERCHECK  3,367,285
TOWING ARRANGEMENT FOR AIRPLANES
Filed July 28, 1965
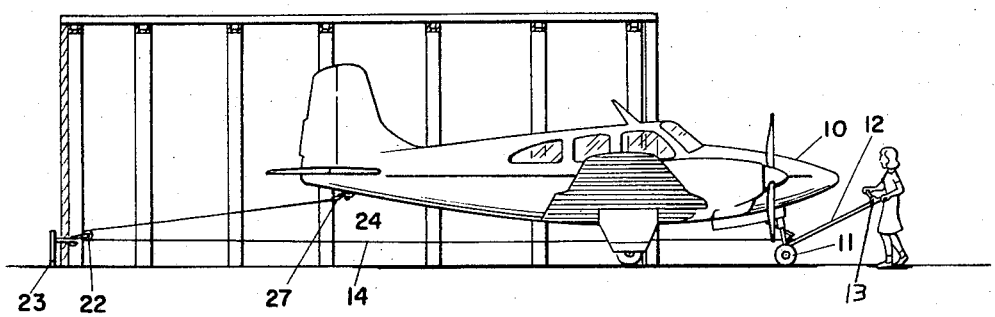
FIG. 1
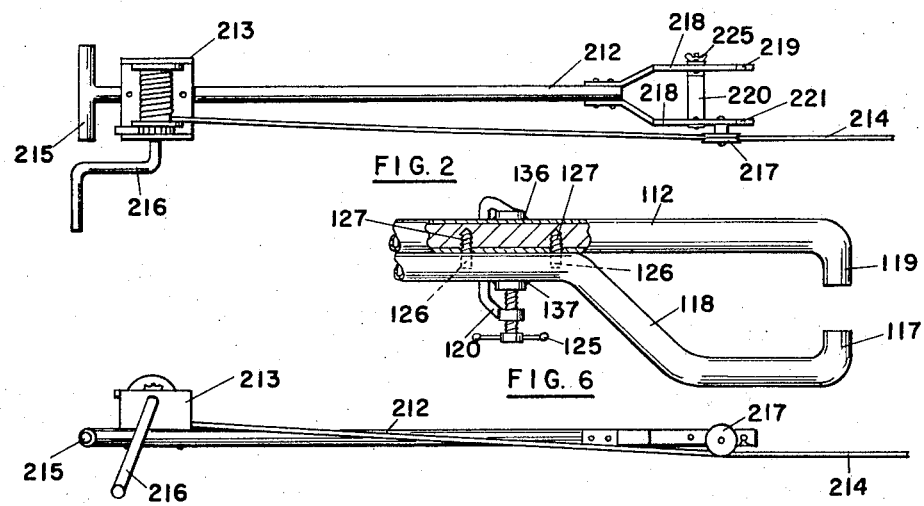
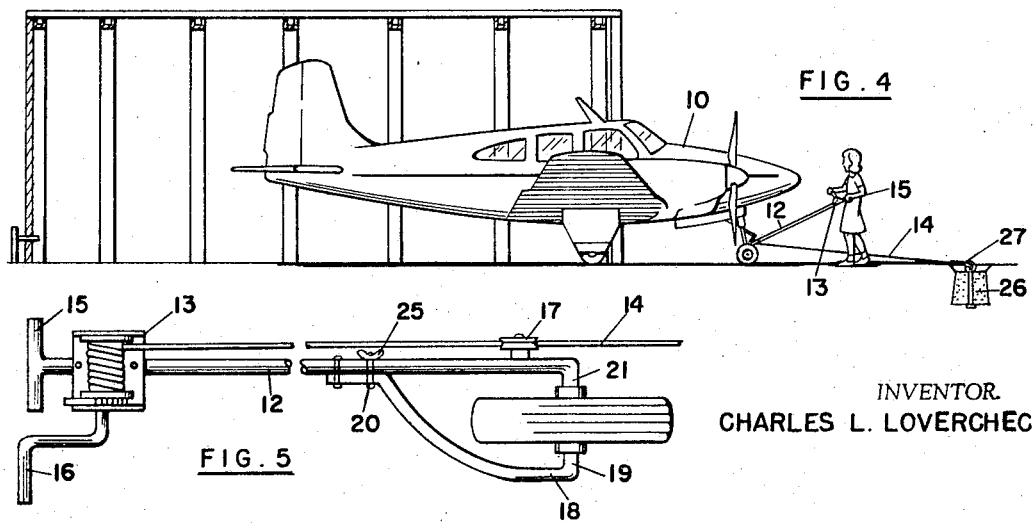
INVENTOR.
CHARLES L. LOVERCHECK

United States Patent Office 3,367,285
Patented Feb. 6, 1968

3,367,285
TOWING ARRANGEMENT FOR AIRPLANES
Charles L. Lovercheck, 632 W. 7th St., Erie, Pa. 16502
Filed July 28, 1965, Ser. No. 475,372
8 Claims. (Cl. 104—173)

ABSTRACT OF THE DISCLOSURE

This invention has to do with a tow-bar for an airplane where the tow-bar is of the conventional type that attaches to the nose wheel of a tricycle gear type airplane. A winch is supported on the tow-bar and the winch is connected to a cable which is in turn connected to some point at a remote position from the aircraft so that by operating the winch, the cable will exert a force on the nose wheel and either push or pull the aircraft towards the point where the end of the cable is attached.

---

This invention relates to aircraft and, more particularly, to tow bars for moving aircraft into and out of hangars and the like.

While the tow bar is especially suited for moving aircraft, it also has general utility in moving various vehicles wherein the vehicles must be steered at the same time they are moved and they must be handled by one person.

There is a problem in moving aircraft, especially where a single person must push the aircraft into the hangar because the modern light twin aircraft and even some of the heavier single engine aircraft are too heavy to be pushed by one person, especially when the ground or floor over which they are to be moved is slightly uneven. Various devices have been suggested for moving aircraft but most of these involve electrical motors which are either supported on the ground and have a cord which connects to the aircraft or they are supported on a tow bar so that they rotate the wheel of the aircraft. In either case, a power supply is required for the motors and, in the usual instance, it is difficult to operate the power means and to steer the aircraft simultaneously.

It is, accordingly, an object of the present invention to provide an improved combination tow bar and power means.

Another object of the invention is to provide a tow bar for attaching to the wheel of a vehicle having a line extending therefrom to be attached to a fixed member and means to exert a force on the line and tow bar.

Still another object of the invention is to provide an improved tow bar for an aircraft.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a side view partly in cross section showing an aircraft being moved into a hangar with a tow bar according to the invention;

FIG. 2 is a top view of a tow bar according to the invention;

FIG. 3 is a side view of the tow bar shown in FIG. 2;

FIG. 4 is a view similar to FIG. 1 showing the aircraft being pulled from the hangar with the tow bar;

FIG. 5 is a top view of another embodiment of the invention; and

FIG. 6 is a partial top view partly in cross section of yet another embodiment of the invention.

Now with more specific reference to the drawing, the aircraft 10 shown has a nose wheel 11 with the usual nose wheel supporting means. A tow bar 12 is shown having a suitable means for attaching it to the nose wheel means. A winch 13 is supported on the main relatively straight part of the tow bar and line 14 is attached to the winch and may be wound on the usual spool of the winch. The tow bar has a hand engaging member 15 on one end, and on the opposite end it has a hub engaging member 21 for attaching it to the nose wheel of an aircraft. The winch 13 has a handle 16 which may be suitably attached to the spool of the winch to wind the line 14 thereon.

A laterally extending member 18 has a nose wheel engaging member 19 thereon and it may be attached to the tow bar by means of the bolt 20 and thumb nut 25 which comprise a clamping means for clamping the two together so that when the nut 25 is loosened, the laterally extending member 18 may be moved away from the nose wheel and thereby release it.

In the embodiment of the invention shown in FIGS. 2 and 3, the tow bar has a relatively straight part 212 with a winch 213 supported on it. The hand engaging member 215 is fixed to one end of the tow bar and the relatively resilient members 218 are fixed to the opposite end. A pulley 217 is attached to one of the resilient members 218 and both resilient members 218 are fixed to the clamp 220 by means of a thumb nut 225 and a suitable bolt. Thus, to pull an aircraft, the resilient members 218 are supported over a pintle which may be received in holes 219 and 221 and the crank 216 rotated, thereby exerting a force on the line 214.

In the embodiment of the invention shown in FIG. 6, a relatively straight member 112 has a nose wheel engaging member 119 turned inward and it has the screw ends 127 of the pintles 126 fixed to it. The straight member 112 may be in the form of a steel tubing having a core made of wood or the like which may receive the pintles 126. The pintles 126 extend into a hole in the laterally extending member 118 and the seat clamp 120 is fixed at 136 to the straight member 112 and a rotating member 137 is fixed to the relatively laterally extending member 118. Thus, when the handle 125 is rotated, the seat clamp 120 clamps the laterally extending member 118 to the straight member 112 and thereby holds them in fixed relation relative to each other with the nose wheel engaging members 119 and 117 received in the hollow hub of the aircraft nose wheel.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a tow bar and a winch,
    a hand engaging member on one end of said tow bar,
    means on the end of said tow bar opposite said hand engaging member to attach said tow bar to a vehicle,
    said winch being attached to said tow bar between said ends thereof,
    a line,
    said winch being adapted to reel said line thereon,
    and means for attaching said line to a fixed member.
2. The combination recited in claim 1 wherein
    a pulley is supported on said tow bar spaced from said winch,
    and said line passes around said pulley.

3. A tow bar for an airplane having a nose wheel means comprising
  attaching means on one end of said tow bar to attach it to said nose wheel means,
  a hand engaging member on the end of said tow bar remote from said attaching means,
  a winch on said tow bar between said two ends,
  a pulley on said tow bar adjacent said attaching means,
  and a line wrapped around said winch and adapted to pass around said pulley and to be attached to a fixed member.
4. The tow bar recited in claim 3 wherein
  said means for attaching said line to a fixed member comprises a pulley having a device thereon for attaching it to said fixed member,
  said line passing through said pulley,
  the end of said line remote from said winch being adapted to be attached to a part of said airplane.
5. The tow bar recited in claim 3 wherein
  said tow bar is made of a relatively straight rigid member having a handle on said hand engaging member,
  said means to attach said tow bar to said nose wheel means being on said end of said straight member remote from said handle,
  a laterally extending member,
  means on said laterally extending member for engaging a side of said nose wheel means,
  and means for urging said laterally extending member and said straight member toward each other whereby said tow bar is attached to said nose wheel means.
6. The tow bar recited in claim 5 wherein
  said laterally extending member is generally Z-shaped, one part of said laterally extending member is disposed in generally parallel relation to said straight member,
  and clamp means is provided to clamp part of said laterally extending member to said straight member.
7. The tow bar recited in claim 6 wherein
  said clamp means comprises a generally C-shaped clamp having one part fixed to said relatively straight member and the other part rotatably fixed to said laterally extending member.
8. The tow bar recited in claim 3 wherein
  said means for attaching said tow bar to said nose wheel means comprises two spaced resilient members attached to said tow bar,
  means on said resilient members to engage said nose wheel means,
  and means to urge said resilient membrs together to engage said nose wheel means.

References Cited

UNITED STATES PATENTS

| | | | |
|---|---|---|---|
| 1,270,724 | 6/1918 | Goud | 254—186 |
| 1,557,784 | 10/1925 | Sharpnack | 254—147 X |
| 1,806,606 | 4/1931 | Booth | 254—186 |
| 2,424,095 | 7/1947 | Horton | 280—503 |
| 2,941,627 | 6/1960 | Beede | 254 |
| 2,944,837 | 7/1960 | Fotheringham | 280—503 |
| 3,132,886 | 5/1964 | Meeks | 280—503 |
| 3,269,740 | 8/1966 | Hutchinson | 280—3 |

ARTHUR L. LA POINT, *Primary Examiner.*

D. F. WORTH, *Assistant Examiner.*